Jan. 2, 1923.
H. S. MELLOTT.
APPARATUS FOR EVAPORATING OR TREATING SUBSTANCES CONTAINING LIQUID.
FILED SEPT. 19, 1917.
1,440,548.
2 SHEETS—SHEET 2.
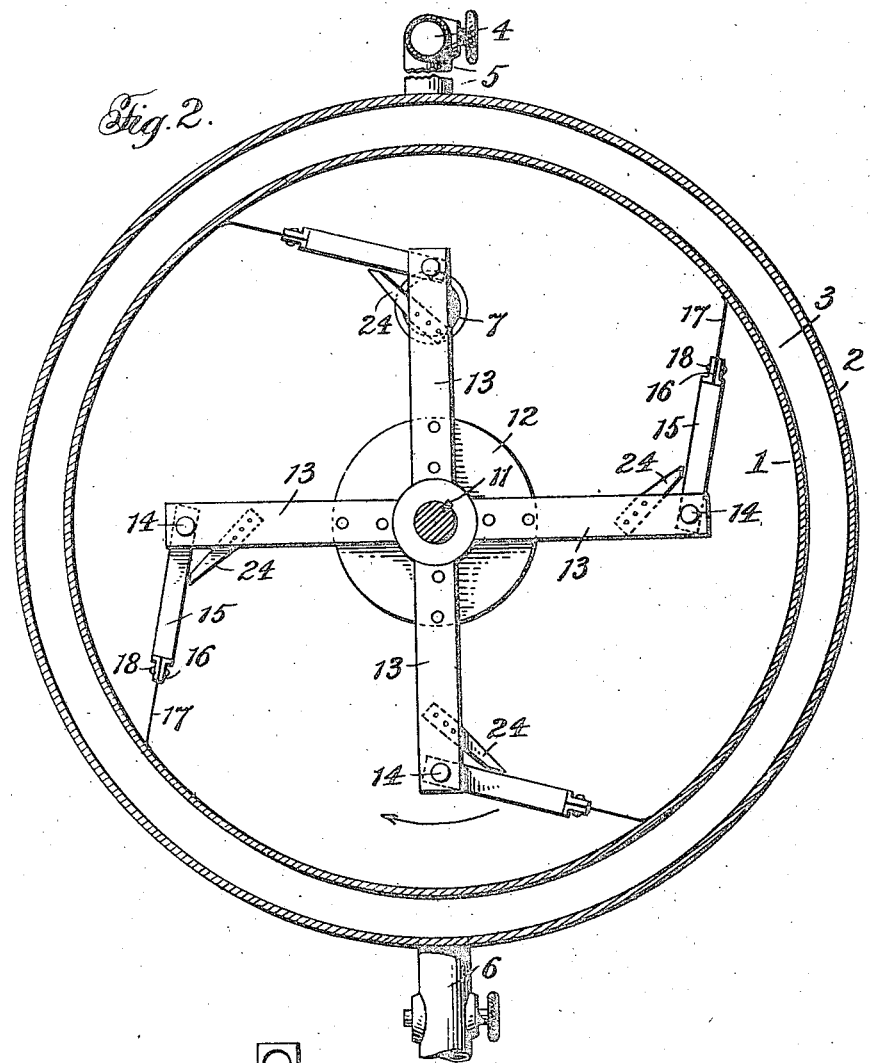
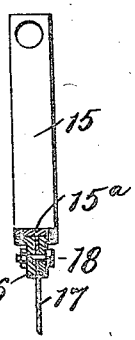

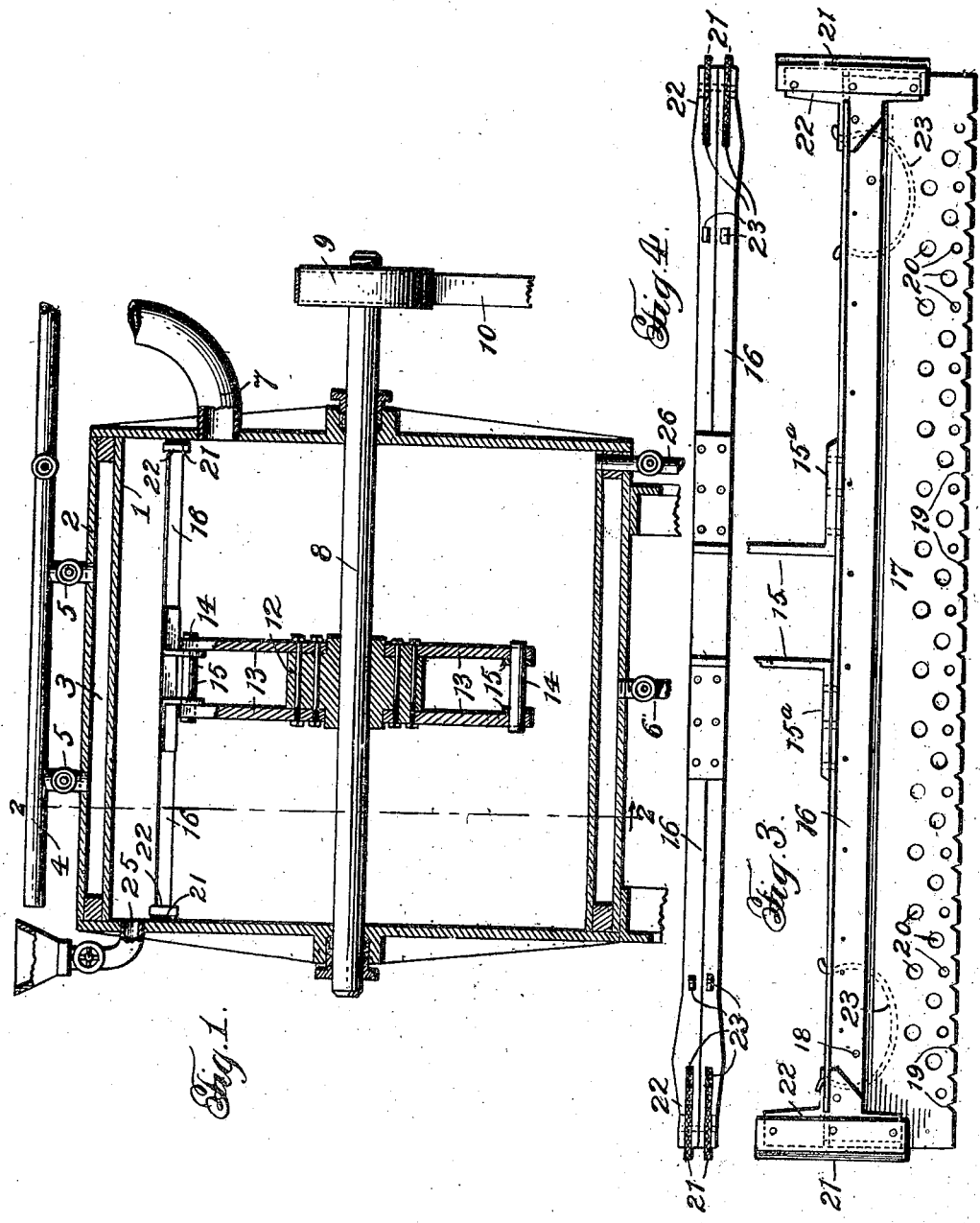

Patented Jan. 2, 1923.

1,440,548

UNITED STATES PATENT OFFICE.

HOWARD S. MELLOTT, OF MORENCI, MICHIGAN, ASSIGNOR TO BY-PRODUCTS RECOVERY COMPANY, OF TOLEDO, OHIO, A CORPORATION OF OHIO.

APPARATUS FOR EVAPORATING OR TREATING SUBSTANCES CONTAINING LIQUID.

Application filed September 19, 1917. Serial No. 192,206.

*To all whom it may concern:*

Be it known that I, HOWARD S. MELLOTT, citizen of the United States, residing at Morenci, in the county of Lenawee and State of Michigan, have invented certain new and useful Improvements in Apparatus for Evaporating or Treating Substances Containing Liquid, of which the following is a specification, reference being had therein to the accompanying drawing.

The present invention relates to an apparatus for evaporating or otherwise treating substances containing liquid, to change the condition or consistency thereof.

The invention has to do more particularly with that type or class of apparatus used in connection with what is known as the "Mabee" process of evaporation, wherein milk or other material to be treated is applied in film form to a curved treating surface subjected to high heat, and maintained under rapid continuous movement and pressure in contact with said surface until the treatment is concluded, the gases and vapors being allowed to freely escape.

In the type of apparatus just described, the temperature transmitted to the treating surface for the material is sufficiently high so that under normal conditions the material would be injured or destroyed were the same allowed to remain for any appreciable time in contact with such surface, but owing to the rapidity of movement of the material, and the short duration of treatment necessary under said process, the material will be devoid of scorched or otherwise disagreeable taste or flavor.

In order to positively maintain the treating surface in a cleansed or polished condition, and devoid of any adhering particles of the material, which would tend to scorch the same, it has been proposed to simultaneously subject the treating surface to a cleansing operation during the movement of the material relative to said treating surface, and in my copending application for patent, Serial No. 22,510, filed April 19, 1915, entitled "Evaporating apparatus", I have illustrated, described and claimed one form of means for the purpose just described, the same including a brush or brushes adapted to contact with the treating surface during the treatment of the material and prevent, or remove, any accumulation of the material in adhering contact with treating surface.

While the brush type of cleansing means has proven very effective and satisfactory for the desired purpose, at the same time it has been ascertained that after considerable use the brushes have a tendency to become disfigured or matted, bristles sometimes become dislodged or broken, and after the brushes become worn, it is necessary from time to time to remove and replace the same.

It is one of the main objects of the present invention to provide in an apparatus of the general character illustrated and described in my copending application referred to, a novel type of conveyor means for the material, and a novel type of cleansing means for the treating surface of the container for the material, the conveyor means in the illustrative embodiment of the invention conveniently also constituting the cleansing means whereby the material is subjected to the necessary movement and the treating surface simultaneously cleansed.

The conveyor and cleansing means contemplated herein embody practically all of the advantages of the prior brush construction, including the necessary yieldability between the same and the treating surface, the maintenance of the continuous film etc., and at the same time overcomes the disadvantages of the prior construction due to the use of such brushes.

In the preferred embodiment of the invention the conveyor means for the material, as well as the surface cleansing means, take the form of one or more elongated metallic blades of yieldable material extending longitudinally over the treating surface and adapted to yieldingly engage said surface during the relative movement of the blades and surface.

A further object of the invention is to so construct the yieldable blades that the material will not bank or accumulate against the blades, but may readily pass by the blades, and to this end the blades are preferably provided with by-passes at the edges thereof as well as in the body thereof, with the result that a substantially continuous uniform film of the material is maintained, as in the previous construction wherein the material was allowed to pass between the bristles of the brush-cleansing means.

Other and further improvements and novel details in the construction and arrangement of the various parts of the apparatus will be understood from the description to follow, which is to be considered in connection with the accompanying drawings, forming a part hereof, and wherein is disclosed, for the purpose of illustration, a convenient and satisfactory embodiment of the invention.

In the drawings, Fig. 1 is a longitudinal section of an apparatus with my improvements applied, parts being shown in elevation.

Fig. 2 is a cross-section substantially on the line 2—2 of Fig. 1 and looking in the direction of the arrow.

Fig. 3 is a detail plan view of one of the conveyor members removed.

Figures 4 and 5 are detail views of the wiper plates and their supports.

With more particular reference to the drawings, like reference numerals referring to corresponding parts throughout the several views, (1) is a container which preferably is substantially cylindrical, and while the same and associated parts are illustrated as arranged substantially horizontally, it is to be borne in mind that the same may take other forms, and in some instances arranged vertically or otherwise. The interior of the cylindrical wall (1) constitutes a treating surface for the material, and in order to impart the necessary temperature to said wall, the same is provided with a cylindrical jacket or casing (2) of relatively increased diameter whereby to provide between the walls (1) and (2) a space (3) for the reception of the temperature transmitting medium.

This transmitting medium, assuming that the apparatus is to be used for the purpose of evaporation or the like, preferably takes the form of steam at a high temperature or pressure, say approximately 300 degrees of Fahrenheit, the steam being introduced in any desired manner as through the conduit (4) and leading from any suitable source of steam supply and communicating with the steam space (3) through the medium of valve controlled pipes or by-passes (5).

The exhaust steam or water of condensation finds an exit through the valve controlled outlet (6) at the base of the steam chamber. The container is open at one or both ends, one opening being illustrated at (7) for the escape of vapors and gases from the material under treatment.

Projecting longitudinally of the container, preferably centrally thereof, and suitably supported for rotatable movement at a high speed, is a shaft (8), the same having operatively associated therewith means for imparting the necessary rotatable movement, for instance a pulley (9) mounted upon one of the projecting ends of the shaft and adapted to receive a suitable endless belt or carrier (10), broken away and adapted to be driven by any suitable power.

It is to be borne in mind that any suitable number of conveyor members may be employed, four being illustrated, since this number has proven highly satisfactory in use. Supported upon the shaft (8) and preferably keyed thereto as at (11) for rotatable movement with the shaft, is a hub member or members (12) upon which are mounted supporting arms (13). Mounted upon the free ends of the arms and extending longitudinally of the container at points spaced inwardly from the treating surface are supporting bars or rods (14). Freely suspended from said bars for oscillating movement are suitable arms (15) which take the form of angled bars, one arm of which has an aperture to receive the bar (14) and the other arms (15ª) of which extending longitudinally of the container are adapted to support suitable angle arms (16) between which latter is mounted the conveyor member (17) proper. These conveyor members (17) are secured in any desired manner as by removable bolts or rivets (18), whereby the same may be removed and replaced at will. The members (17) are formed of very thin material such as sheet-steel, and being relatively wide, they are quite yieldable whereby to readily conform to any slight irregularity in the contour of the cylindrical treating surface.

The conveyor members are adapted to be rotated preferably in the direction of the arrow (see Fig. 2 of the drawing), and it has been found that better results are obtained by suspending the blades at an angle disposed rearwardly, in the direction of rotation, from the supporting arms (13), the inclined disposition of the arms (15) and blades (17) being preferably slightly less than at right angles to the longitudinal axis of the arms (13). As thus constructed the blades have a dragging effect on the treating surface as distinguished from running ahead of the supporting arms (13), and this action of the blades will prevent to a large extent frothing or foaming which is highly injurious in the treatment of milk or the like.

It is desirable, and rather important, that the blades be of a construction to permit of rather free circulation of the material under treatment, and it is proposed to provide at the outer edge of the blades a series of closely associated cut-out parts or notches (19), and a plurality of apertures (20) in the body portion of the blades, said apertures conveniently varying in size as illustrated, and arranged in alternate relation, with the result that the material may freely pass over or under the edges of the blade as well as through the body portion of the blades, thereby maintaining a continuous film formation of the material during the treatment of the latter.

It will be appreciated that the notches in succeeding blades may be offset with regard to those of preceding blades, with the result that the entire cylindrical treating surface will be engaged by some portion of the blades, thereby maintaining said entire surface free from adhering particles of the material.

It may be desirable to provide end or head scraper members (21) of suitable yieldable material, such as wood, fabric, or other material, the same being mounted upon suitable supports (22) removably mounted in any desired manner upon the angled arms (16) and spring pressed outwardly as by springs (23) whereby to constantly engage the opposite ends of the container and maintain the same free of any adhering accumulation of material.

Suitable abutment members (24) may be provided, the same being adapted to engage the supporting arms (15) thereby preventing the blades (17) from falling back when the machine is being run so slowly that centrifugal force does not hold the same out against the wall of the container.

It is to be borne in mind that while the members (17) constitute both the means for conveying the material and the means for cleansing the treating surface, the members (17) and associated parts may be used in connection with conveyor members of other construction if desired in which event any number of said conveyor members may be employed, and one of the scraping, cleansing or polishing blades (17) will probably suffice for use in connection therewith.

The material to be treated is conveniently introduced through the inlet port (25), and discharged in the same manner through the outlet port (26).

The operation may be reviewed as follows:

Assuming it is desired to evaporate milk or the like, the material is fed through the inlet (24) and in direct contact with the treating surface formed by the cylindrical wall (1) which said wall is subjected to heat at a high temperature, say 300°. The conveyor means while the material is being fed into the container is moved approximately 200 to 400 revolutions per minute, thereby forcing the blades outwardly into contact with the treating surface and maintaining the same in this position under centrifugal force whereby the material is applied in continuous layer formation upon the treating surface and subjected to rotatable movement as well as endwise movement over said surface. Because of the rapid speed of said blades and the resultant movement of the film of material, the latter does not remain for any appreciable period in contact with the surface, which may be subjected to an ordinarily destructive temperature for the material.

In view of the peculiar construction of the blades, the material in continuous circular film formation is rapidly rotated under centrifugal force, and pressure, and at the same time proper circulation of the material relative to the blades is accommodated, for, since the same freely passes through the notched portions of the apertures of the blades, resulting in the formation of a substantially uniform character of film as well as a continuous movement thereof.

The blades being of a flexible character, the same will closely contact with the interior treating surface of the container, accommodating themselves to all slight irregularities in said treating surface, and the thinness of the blade maintains a relatively sharp edge regardless of the wear on the blade. The cylinder will at all times assume a cleansed and polished condition free from any adhering particles of the material which would tend to impart to the resultant product a scorched or otherwise objectionable odor and taste.

As illustrated, the blades are disposed so that, when forced outwardly under centrifugal pressure they will assume operative positions at approximately an angle of 80° relative to the longitudinal axis of the supporting arms (13). It has also been found that the extreme edge if slightly bevelled will act more efficiently. The construction of conveyor blades and their supporting characteristics accomplish more effective results than prior constructions for similar purposes, in that the present structure is best suited to properly position the blades in engagement with the surface for cleansing purposes, and at the same time accomplish the necessary and proper propelling force to the liquid without the likelihood of skimming over the film of liquid generated by the blade.

Simultaneously with the formation and maintenance under movement of the film of material and the cleansing of the cylindrical treating surface, the end walls of the container will be maintained in a cleansed condition under the action of the end scrapers (21), as previously noted.

What I claim is:

1. In an apparatus of the character described, the combination of a substantially cylindrical container having a copious discharge for vapors, means for highly heating the container wall, means for introducing the material to be treated adjacent one end of the container, and for permitting discharge of the material adjacent the opposite end of the container, and means for engaging the material as introduced into the container and applying the same in the form of a continuous circumferential film and for maintaining said film formation under continuous rotatable movement with respect to the surface until its discharge from the container, the said means comprising a rapidly rotatable centrally disposed shaft, arms rigid on the shaft adjacent opposite ends of the container, auxiliary arms pivotally mounted on said first-mentioned arms, and elongated, thin, flat, flexible metallic blades extending longitudinally of the treating surface and secured adjacent opposite ends to said auxiliary arms, and said blades having by-pass openings at the edges thereof which contact with the cylindrical surface of the container.

2. In an apparatus of the character described, the combination of a cylindrical container of substantially the same diameter throughout, a centrally disposed shaft, means for applying sufficient heat to the cylindrical wall of the container to evaporate liquid constituents of the material under treatment therein, means for introducing the material at one end, and continuously withdrawing the material as treated from the opposite end of the container, a plurality of circumferentially spaced thin, flat, yieldable metallic blades adapted to engage the cylindrical surface of the container and substantially co-extensive therewith, end supports on the shaft, means for pivotally mounting the said blades at their ends on said supports, said container having a large end opening for the unrestricted escape of vapors, and means for rotating said shaft at sufficient speed to move the blades under centrifugal force into yieldable contact with the surface and to maintain the material in movable film formation from the time of its introduction until its discharge from the container, the space between the shaft and said blades intermediate the end supports beings substantially unobstructed to form a quiet receiving zone for the vapors to be discharged through the vapor opening.

3. In an apparatus of the character described, the combination of a cylindrical container of substantially the same diameter throughout, a centrally disposed shaft, means for applying sufficient heat to the cylindrical wall of the container to evaporate liquid constituents of the material under treatment therein, means for introducing the material at one end, and withdrawing the material as treated from the opposite end of the container, a plurality of circumferentially spaced thin flat, yieldable metallic blades adapted to engage the cylindrical surface of the container and substantially co-extensive therewith, end supports on the shaft, means for pivotally mounting the said blades at their ends on said supports, said container having a large end opening for the unrestricted escape of vapors, means for rotating said shaft at sufficient speed to move the blades under centrifugal force into yieldable contact with the surface and to maintain the material in movable film formation from the time of its introduction until its discharge from the container, the space between the shaft and said blades intermediate the end supports being substantially unobstructed to form a quiet receiving zone for the vapors to be discharged through the vapor opening, and reciprocal blocks mounted on said shaft and adapted to engage the end walls of the container to prevent dripping or accumulation of the material from said film on said end walls.

4. In an apparatus for treating substances containing liquid, to change the condition thereof, the combination of a horizontal cylindrical container of substantially the same diameter throughout, the inner surface of which constitutes a treating surface for the material, a rotatable shaft within the container, a support on the shaft, means for rotating said shaft in one direction at a high speed, and a longitudinally disposed conveyor member substantially coextensive with the treating surface hingedly connected to said support so as to extend in a direction rearwardly of said support in the rotatable movement thereof, said conveyor being adapted in its rapid movement to form and maintain a continuous moving circular film of material in contact with the treating surface, and to maintain the treating surface in a cleansed condition.

5. In an apparatus for treating liquid substances to change the condition thereof, the combination of a cylindrical treating surface and internal means for applying the material in layer formation upon said surface and for subjecting said layer to continuous rotatable movement over the surface, said means including a rotatable part, pivotally connected conveyor members extending lengthwise of the side of the cylindrical container and disposed at an angle rearwardly in the direction of movement of said rotatable part, said conveyor members being yieldingly mounted and also yieldable itself throughout the surface of the engaging portion thereof, and adapted to maintain the surface of the container clean and polished, and means rotatable with said rotatable part for simultaneously maintaining the end walls of the container in a cleansed condition.

6. In an apparatus for treating substances containing liquid, to change the condition thereof, the combination of a substantially horizontal cylindrical container of substantially the same diameter throughout, the inner surface of which constitutes a treating surface for the material, a rotatable shaft within the container, a support on the shaft, means for rotating said shaft in one direction at a high speed, and a longitudinally disposed conveyor member hingedly connected to said support so as to extend in a direction rearwardly of said support in the rotatable movement thereof, said conveyor member being substantially coextensive with the cylindrical wall of the container, and said conveyor being adapted to form and maintain a continuous moving circular film of material in contact with the treating surface, and to maintain the treating surface in a cleansed condition, and connected mechanism for yieldably engaging the ends walls of the container to remove adhering particles of the material therefrom.

7. In an apparatus of the character described, the combination of a horizontally disposed centrifugal container, the inner surface of the peripheral wall thereof constituting a treating surface, said container having an inlet at one end and an outlet at its opposite end for the material, a centrally disposed rotatable shaft, a series of circumferentially spaced end supports projecting outwardly through the shaft, pivotally disposed arms mounted on said end supports and projecting rearwardly from the direction of travel of the supports, and thin, flat, flexible metallic blades substantially coextensive with the treating surface and adapted to engage the same at one edge, the said blades being secured at their opposite edge only to said arms and being otherwise unsupported intermediate their edges substantially throughout their length, and successive blades being provided with non-registering by-pass cut-out parts for the material under treatment.

8. In an apparatus for treating liquid substances to change the condition thereof, the combination of a cylindrical container of substantially the same diameter throughout, means for imparting to the surface of the container heat of a temperature sufficient to evaporate liquid constituents of the material, and interior means for forming and maintaining under continuous movement a circular film of material in contact with said surface, said means including a rotatable shaft, arms projecting outwardly from the shaft, and hingedly connected conveyor members pivotally mounted on said arms and disposed to engage the treating surface by a rearwardly dragging movement, the space within and between the confines of the conveyor members being substantially unobstructed to form a vapor receiving zone.

9. In an apparatus for treating liquid substances to change the condition thereof, the combination of a cylindrical container, means for imparting to the surface of the container heat sufficient to evaporate liquid constituents of the material, and interior means for forming and maintaining under continuous movement a circular film of material in contact with said surface, said means including a rotatable shaft, rigid arms projecting outwardly from the shaft, and hingedly connected conveyor members substantially co-extensive with said surface pivotally mounted on said arms and disposed to engage the treating surface by a rearwardly dragging movement, said conveyor members being constructed of flexible metal and arranged whereby to remove any adhering particles of material from said treating surface.

10. In an apparatus for treating substances containing liquid, the combination of a substantially cylindrical container, means for subjecting the wall thereof to heat sufficient to evaporate liquid constituents of the material, said container having an unobstructed opening at one end of sufficient size for the rapid escape of vapors and gases, and rotatable means within the container for engaging and maintaining under continuous circumferential movement over said surface a thin layer of the material, said means including a rapidly rotatable support, and one or more connected conveyor members longitudinally of the treating surface adjacent thereto and substantially coextensive therewith, the space within the container inside of said blades being substantially unobstructed to form a vapor zone, and said conveyor members having a yieldable notched edge.

11. In an apparatus for treating substances containing liquid, the combination of a substantially cylindrical container, means for subjecting the wall thereof to heat sufficient to evaporate liquid constituents of the material, said container having an unobstructed opening at one end of sufficient size for the rapid escape of vapors and gases, and means within the container for engaging and maintaining under continuous circumferential movement over said surface, a thin layer of the material, said means including a rapidly rotatable central shaft, and one or more connected radially narrow conveyor members extending longitudinally of the treating surface adjacent thereto substantially coextensive with the cylindrical wall of the container, said conveyor members having a yieldable edge, and cut out parts in said edge as well as in the body portion thereof.

12. In an apparatus for treating substances containing liquid, the combination of a substantially cylindrical container, forming an interior treating surface, means for subjecting the surface to heat, said container having a large opening at one end for the unresisted escape of vapors and gases, and rotatable means within the container for engaging and maintaining under continuous circumferential movement over said surface a thin layer of the material, said means being radially narrow whereby to leave between it and the central portion of the container a substantially unobstructed central vapor space, and said means including a rotatable support, and one or more connected conveyor members extending longitudinally of the treating surface adjacent thereto, said conveyor members comprising an elongated thin flat strip of material having an irregular engaging edge.

13. In an apparatus for treating substances containing liquid, the combination of a substantially cylindrical container forming an interior treating surface, means for subjecting the surface to heat sufficient to evaporate liquid constituents of the material, said container having a large opening at one end for the escape of vapors and gases, and rotatable means within the container cooperating with the wall thereof for engaging and maintaining under continuous circumferential and endwise movement over said surface, a thin layer of the material, said means including a rapidly rotatable support, and one or more connected conveyor members disposed longitudinally of the treating surface adjacent thereto, the space bordered by said conveyor members being substantially unobstructed for the reception of vapors, and said conveyor members comprising an elongated thin flat strip of material having an irregular engaging edge and a plurality of apertures through the body portion thereof.

14. In an apparatus for evaporating substances containing liquid, the combination of a substantially cylindrical container of the same diameter throughout, means for subjecting the wall thereof to high heat, said container having an open end for the free and rapid escape of vapors and gases, and rotatable means within the container for engaging and maintaining under continuous circumferential movement over the inner surface of said wall, a thin layer of the material, said means including a rotatable central shaft, and one or more connected radially narrow conveyor members disposed longitudinally of the treating surface adjacent thereto adapted to contact therewith, the space between said shaft and conveyor members being substantially unobstructed for the reception of vapors, and said conveyor members comprising elongated thin strips of flexible metal having by-pass openings in the edges thereof for the material under treatment, the said by-pass openings in successive strips of metal being out of register.

15. In an apparatus for evaporating substances containing liquid such as milk, the combination of a substantially cylindrical container, means for subjecting the wall thereof to heat sufficient to evaporate liquid constituents of the material, said container having an unobstructed opening in one end for the free escape of vapors and gases, and rotatable means within the container for engaging and maintaining under continuous circumferential movement over the inner surface of said wall a thin layer of the material, said means including a rotatable support, and one or more connected conveyor members disposed longitudinally of the treating surface adjacent thereto, the space between the rotatable support and conveyor members being substantially unobstructed for the reception of vapors, said conveyor members comprising radially narrow elongated strips of metal yieldable throughout its edge and having by-pass openings in the edge and in the body portion thereof for the material under treatment, the by-pass openings in successive strips of metal being out of register.

16. In an apparatus for treating liquid substances to change the condition thereof, the combination of a cylindrical container having means for imparting to the walls thereof a temperature different from that of the material under treatment, internal rotatable means for forming and maintaining under continuous circumferential movement a circular film of material in contact with the interior surface of the container, and associated means for maintaining the interior surface of the container in a cleansed or polished condition, including an elongated strip of metal substantially coextensive with the interior treating surface of the container having openings passing therethrough extending longitudinally of the cylindrical surface and in contact therewith, said strip being readily yieldable in different directions to readily accommodate itself to said surface.

17. In an apparatus for treating liquid substances to change the condition thereof, the combination of a cylindrical container having means for imparting to the walls thereof a temperature different from that of the material under treatment, internal rotatable means cooperating with the wall of the container for forming and maintaining under continuous circumferential and simultaneous endwise movement a circular film of material in contact with the interior surface of the container, and associated means for maintaining the interior surface of the container in a cleansed or polished condition, including an elongated thin strip of yieldable metal having a broken engaging edge providing openings for the circulation of the material.

18. In an apparatus for evaporating liquid substances to change the condition thereof, the combination of a cylindrical container having means for imparting to the walls thereof an evaporating heat temperature different from that of the material under treatment, internal rotatable means cooperating with the wall of the container for forming and maintaining under continuous circumferential and endwise movement a circular film of material in contact with the interior surface of the container, and associated means for maintaining the interior surface of the container in a cleansed or polished condition, including an elongated strip of metal having a surface engaging edge with a plurality of by-passes, and a plurality of openings in the body thereof for the circulation of the material, the space between said strip of metal and the center of the container being substantially unobstructed.

19. In an apparatus for treating liquid substances to change the condition thereof, the combination of a cylindrical treating surface, means for applying heat to said surface sufficient to evaporate liquid constituents of the material, means cooperating with the wall of the container for applying to and maintaining under circumferential and endwise movement a film of the material to be treated and for simultaneously maintaining the treated surface free from adhering particles of the material, associated means for simultaneouusly engaging the end walls of the container to remove adhering particles of the material, and means permitting the gases and vapors to freely escape from the central zone within the layer of material to the outside of the container, and said container having an outlet opening for the continuous discharge of the treated material.

20. In an apparatus for treating liquid substances to change the condition thereof, the combination of a substantially cylindrical container, means for imparting to the wall thereof, heat sufficient to evaporate liquid constituents of the material, internal means for forming and maintaining under circumferential movement a lengthwise movable film or layer of the material in contact with the inner surface, and connected mechanism for maintaining the inner surface of the container and end walls thereof in a cleansed condition, said container having an opening for the continuous discharge of the treated material, and means for permitting the gases and vapors to freely escape from the container.

21. In an evaporating apparatus, a cylindrical container or drum, having concentric with its central longitudinal axis an interior concave surface and end surfaces, a central rotatable shaft, means to rotate said shaft at a high speed, a plurality of circumferentially spaced thin blades of yieldable metal adapted to conform to the cylindrical surface while moved in engagement therewith, means to operatively connect said blades with said shaft and to permit same to be impelled by centrifugal force yieldingly in contact with said surface, blocks normally contacting with said end surfaces of the container, and means to operatively connect said blocks with said shaft and to constantly yieldingly impel the same towards said end surfaces during rotation of the shaft.

22. An apparatus of the character described comprising a container adapted to receive a liquid and having a treating surface, means for supplying heat to the treating surface of the container sufficient to evaporate liquid constituents, and a rotatable conveyor disposed within said container extending longitudinally of and substantially coextensive with said surface, and having a thin edge portion extending lengthwise thereof in contact with the treating surface of the container, said conveyor having a plurality of openings passing therethrough, and said container having an opening for the continuous discharge of treated material at the end opposite the inlet end of the container.

23. An apparatus of the character described comprising a container adapted to receive a liquid and having a treating surface, and a plurality of circumferentially spaced rotatable conveyors disposed within said container extending longitudinally of said surface and substantially coextensive therewith, and having a thin edge portion extending lengthwise thereof in contact with the treating surface of the container, said conveyors having a plurality of by-passes in their operative edges and separated openings passing through the body thereof, the by-passes in the respective conveyors being out of register.

24. In an evaporating apparatus, a cylindrical container, or drum, having concentric with its central longitudinal axis an interior concave surface and thereto angularly disposed interior end surfaces; within said drum a therewith concentric rotatory shaft; means to rotate said shaft; a reciprocatable block normally contacting with one of said end surfaces, and means to operatively connect said block with said shaft and constantly, yieldingly impel it toward said end surface during rotation of the shaft.

25. In an evaporating apparatus, a cylindrical container, or drum, having concentric with its central longitudinal axis an interior concave surface and thereto angularly disposed interior end surfaces; within said drum a therewith concentric rotary shaft; means to rotate said shaft; a reciprocatable block of organic material normally contacting with one of said end surfaces, and means to operatively connect said block with said shaft and constantly yieldingly impel it toward said end surface during rotation of the shaft.

26. In an evaporating apparatus, the combination of a cylindrical container, means for supplying heat to the cylindrical wall of the container, said container having an inlet adjacent one end for the material and an outlet adjacent the opposite end for the treated material, and said container having in one end a copious opening for the free discharge of vapors, means for applying circumferential movement to the material, comprising rotatable blades extending longitudinally of, and adapted to contact with the periphery of the container, said blades having by-pass openings for the material in the free edges thereof, and the openings in succeeding blades being out of registration with one another.

27. In an evaporating apparatus, the combination of a cylindrical container, means for supplying heat to the cylindrical wall of the container, said container having an inlet adjacent one end for the material and an outlet adjacent the opposite end for the treated material, and said container having in one end a copious opening for the free discharge of vapors, and means for applying circumferential movement to the material, comprising rotatable blades extending longitudinally of and adapted to contact with the peripheral wall of the container, said blades having by-pass openings for the material in the free edges thereof, the openings in succeeding blades being out of registration, and the said blades being constructed of yieldable material whereby to yieldably engage the surface of the container, and whereby during the process of moving the material over the said surface the said surface will be simultaneously and continuously cleansed.

In testimony whereof I hereunto affix my signature in the presence of two witnesses.

HOWARD S. MELLOTT.

Witnesses:
H. THANE BAUMAN,
IRENE ACKLAND.